(12) United States Patent
Vido (10) Patent No.: US 11,518,137 B2
(45) Date of Patent: Dec. 6, 2022

(54) ROOFING UNDERLAYMENT WITH HYDROPHOBIC NONWOVEN CORE

(71) Applicant: Owens Corning Intellectual Capital, LLC, Toledo, OH (US)

(72) Inventor: Martin Vido, Surrey (CA)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 203 days.

(21) Appl. No.: 16/909,046

(22) Filed: Jun. 23, 2020

(65) Prior Publication Data
US 2020/0399904 A1    Dec. 24, 2020

Related U.S. Application Data

(60) Provisional application No. 62/865,581, filed on Jun. 24, 2019.

(51) Int. Cl.
*B32B 5/02*    (2006.01)
*B32B 5/26*    (2006.01)
(Continued)

(52) U.S. Cl.
CPC ............... *B32B 5/022* (2013.01); *B32B 5/26* (2013.01); *B32B 5/265* (2021.05); *B32B 5/266* (2021.05); *B32B 5/271* (2021.05); *B32B 7/02* (2013.01); *B32B 27/02* (2013.01); *E04D 12/002* (2013.01); *B32B 5/08* (2013.01); *B32B 27/08* (2013.01); *B32B 27/18* (2013.01); *B32B 2250/03* (2013.01); *B32B 2250/04* (2013.01); *B32B 2250/05* (2013.01); *B32B 2250/24* (2013.01); *B32B 2250/242* (2013.01); *B32B 2255/02* (2013.01); *B32B 2255/26* (2013.01);
(Continued)

(58) Field of Classification Search
None
See application file for complete search history.

(56) References Cited

U.S. PATENT DOCUMENTS 4,041,203 A * 8/1977 Brock ....................... B32B 5/08
                                                    206/439
4,342,804 A * 8/1982 Meynard ................. D06N 5/00
                                                    427/245
(Continued)

FOREIGN PATENT DOCUMENTS

CN    102794959 A  * 11/2012
CN    103696147 A  *  4/2014  ............ B32B 27/12
(Continued)

OTHER PUBLICATIONS

Machine Translation of JP-0978426-A, Mar. 1997 (Year: 1997).*
(Continued)

*Primary Examiner* — Jeffrey A Vonch
(74) *Attorney, Agent, or Firm* — Calfee, Halter & Griswold LLP (57) ABSTRACT

A roofing underlayment includes a hydrophobic nonwoven core layer that provides enhanced resistance to water infiltration. In addition to the hydrophobic nonwoven core layer, the roofing underlayment includes a coating layer adhered to a surface of the hydrophobic nonwoven core layer, and an exterior surface layer adhered to the coating layer. A roofing system that includes the roofing underlayment is also provided.

16 Claims, 2 Drawing Sheets

(51) Int. Cl.
*B32B 27/12* (2006.01)
*E04D 12/00* (2006.01)
*B32B 7/02* (2019.01)
*B32B 27/02* (2006.01)
B32B 27/08 (2006.01)
B32B 5/08 (2006.01)
D06N 5/00 (2006.01)
B32B 27/18 (2006.01)

(52) U.S. Cl.
CPC ... B32B 2262/0253 (2013.01); B32B 2274/00 (2013.01); B32B 2305/20 (2013.01); B32B 2307/718 (2013.01); B32B 2307/73 (2013.01); B32B 2307/744 (2013.01); B32B 2419/06 (2013.01); D06N 5/00 (2013.01); Y10T 428/2495 (2015.01); Y10T 428/24942 (2015.01); Y10T 428/27 (2015.01); Y10T 428/273 (2015.01); Y10T 442/602 (2015.04); Y10T 442/66 (2015.04); Y10T 442/678 (2015.04); Y10T 442/681 (2015.04)

(56) References Cited

U.S. PATENT DOCUMENTS

| | | | |
|---|---|---|---|
| 4,656,082 A * | 4/1987 | Goodacre | E04D 12/002 442/232 |
| 4,766,029 A * | 8/1988 | Brock | D04H 1/559 428/374 |
| 4,789,699 A * | 12/1988 | Kieffer | C09J 7/10 428/221 |
| 5,130,178 A | 7/1992 | Zerfass et al. | |
| 5,204,165 A | 4/1993 | Schortmann | |
| 5,308,691 A | 5/1994 | Lim et al. | |
| 5,616,408 A | 4/1997 | Oleszczuk et al. | |
| 5,687,517 A * | 11/1997 | Wiercinski | B32B 7/12 52/783.17 |
| 5,925,581 A * | 7/1999 | Tolbert | B01D 39/1623 442/381 |
| 5,939,341 A | 8/1999 | Brown et al. | |
| 5,942,452 A * | 8/1999 | Daponte | D04H 3/105 442/388 |
| 6,296,912 B1 | 10/2001 | Zickell | |
| 6,764,968 B1 | 7/2004 | Hindi et al. | |
| 6,804,922 B1 * | 10/2004 | Egan | E04B 1/66 52/746.1 |
| 6,864,194 B2 | 3/2005 | Hindi et al. | |
| 6,925,766 B2 | 8/2005 | Di Pede | |
| 7,148,160 B2 | 12/2006 | Porter | |
| 7,718,558 B2 | 5/2010 | Galvin | |
| 7,786,028 B2 | 8/2010 | Souther et al. | |
| 7,803,725 B2 | 9/2010 | Payne et al. | |
| 7,882,671 B2 | 2/2011 | Bruce et al. | |
| 7,919,420 B2 | 4/2011 | Bornemann et al. | |
| 7,977,259 B2 | 7/2011 | Ratcliff et al. | |
| 8,349,103 B2 | 1/2013 | Suzuka et al. | |
| 8,765,251 B2 | 7/2014 | Strait | |
| 9,314,994 B2 | 4/2016 | Strait | |
| 9,359,014 B1 * | 6/2016 | Yang | B62D 25/06 |
| 9,415,563 B2 | 8/2016 | Xiang Li | |
| 9,540,820 B2 | 1/2017 | Kalkanoglu et al. | |
| 10,161,063 B2 | 12/2018 | Westwood | |
| 10,161,129 B2 | 12/2018 | Hickie et al. | |
| 2002/0055316 A1 | 5/2002 | Araida et al. | |
| 2002/0139076 A1 * | 10/2002 | Carr, III | E04D 5/12 52/409 |
| 2003/0077964 A1 * | 4/2003 | Klein | E04D 12/002 428/343 |
| 2004/0023585 A1 | 2/2004 | Carroll et al. | |
| 2004/0127120 A1 * | 7/2004 | Zanchetta | B32B 27/12 442/41 |
| 2004/0148887 A1 * | 8/2004 | Di Pede | B32B 11/10 428/59 |
| 2004/0214489 A1 * | 10/2004 | Porter | B32B 37/0084 442/45 |
| 2006/0046084 A1 * | 3/2006 | Yang | E04D 5/10 525/240 |
| 2006/0228962 A1 | 10/2006 | Souther et al. | |
| 2006/0286347 A1 * | 12/2006 | Mehta | B32B 3/266 428/137 |
| 2007/0077838 A1 * | 4/2007 | Binkley | E04D 12/002 442/268 |
| 2007/0193167 A1 * | 8/2007 | Bruce | B32B 27/08 52/408 |
| 2007/0194482 A1 | 8/2007 | Douglas et al. | |
| 2007/0249252 A1 * | 10/2007 | Galvin | E04D 12/002 442/364 |
| 2007/0275621 A1 | 11/2007 | Bennett et al. | |
| 2007/0277450 A1 * | 12/2007 | Raulie | B32B 25/00 52/90.1 |
| 2008/0020662 A1 * | 1/2008 | Strait | D04H 3/14 442/45 |
| 2008/0026663 A1 * | 1/2008 | Zhang | E04D 12/002 264/176.1 |
| 2008/0081152 A1 * | 4/2008 | Khan | E04D 5/10 428/143 |
| 2008/0092474 A1 * | 4/2008 | Gan | E04D 12/002 52/413 |
| 2008/0141604 A1 * | 6/2008 | Arthurs | E04D 12/002 52/408 |
| 2008/0152867 A1 * | 6/2008 | Di Pede | B32B 5/024 427/256 |
| 2008/0166533 A1 * | 7/2008 | Jones | E04B 1/66 156/60 |
| 2008/0176022 A1 * | 7/2008 | Payne | D04H 11/00 427/372.2 |
| 2008/0227350 A1 * | 9/2008 | Schroer | E04D 12/002 156/273.1 |
| 2008/0227353 A1 * | 9/2008 | Klingelhage | D06N 5/00 442/374 |
| 2008/0289289 A1 * | 11/2008 | Wiercinski | B32B 27/12 52/745.06 |
| 2009/0041999 A1 * | 2/2009 | Schroer | B32B 27/36 428/220 |
| 2009/0202803 A1 * | 8/2009 | Poloso | B32B 27/281 428/213 |
| 2010/0056004 A1 | 3/2010 | Galvin et al. | |
| 2010/0077684 A1 | 4/2010 | Socha | |
| 2010/0173110 A1 | 7/2010 | Wiercinski et al. | |
| 2010/0178827 A1 * | 7/2010 | Thai | E04D 12/002 442/247 |
| 2010/0260990 A1 * | 10/2010 | Lunghi | B32B 27/205 428/339 |
| 2011/0003116 A1 * | 1/2011 | Drechsler | B32B 27/32 442/376 |
| 2011/0009024 A1 | 1/2011 | Clark | |
| 2012/0096791 A1 * | 4/2012 | Cashin | B32B 27/12 52/409 |
| 2012/0315471 A1 * | 12/2012 | Mancosh | B29C 48/22 428/537.1 |
| 2013/0180203 A1 * | 7/2013 | Xiangli | E04B 1/62 427/256 |
| 2014/0050894 A1 * | 2/2014 | Wahlquist | D04H 5/08 156/62.4 |
| 2014/0062126 A1 * | 3/2014 | Weinberg | B32B 33/00 156/289 |
| 2014/0147642 A1 * | 5/2014 | Weinberg | B29C 66/712 156/308.2 |
| 2014/0215962 A1 * | 8/2014 | Xiang Li | B32B 5/024 156/220 |
| 2016/0185077 A1 * | 6/2016 | Andrews | B32B 37/10 156/60 |
| 2017/0036429 A1 * | 2/2017 | Harfmann | C09D 175/06 |
| 2017/0190146 A1 * | 7/2017 | Shen | B32B 27/02 |
| 2017/0198470 A1 * | 7/2017 | Hickie | B32B 27/08 |
| 2017/0306628 A1 * | 10/2017 | Simonis | B32B 25/08 |
| 2017/0326835 A1 * | 11/2017 | Xiang Li | B32B 7/12 |
| 2017/0368810 A1 * | 12/2017 | Zacarias | C08L 23/0815 |
| 2018/0029345 A1 * | 2/2018 | Tijssen | B32B 27/285 |

(56) References Cited

U.S. PATENT DOCUMENTS

| | | | |
|---|---|---|---|
| 2018/0245349 A1* | 8/2018 | Shepherd | B32B 7/12 |
| 2018/0355617 A1 | 12/2018 | Granovsky et al. | |
| 2019/0211565 A1* | 7/2019 | Hascher | E04D 13/17 |
| 2019/0277028 A1* | 9/2019 | Chevillard | B32B 3/26 |
| 2020/0299966 A1* | 9/2020 | Tang | E04D 5/08 |
| 2020/0376796 A1* | 12/2020 | Flaig | B32B 7/08 |
| 2020/0399903 A1* | 12/2020 | Vido | B32B 27/308 |
| 2021/0079657 A1* | 3/2021 | Vido | E04D 12/002 |
| 2021/0316541 A1* | 10/2021 | Bachon | B32B 27/32 |

FOREIGN PATENT DOCUMENTS

| | | | | |
|---|---|---|---|---|
| CN | 110154470 A | * | 8/2019 | ............ B32B 37/06 |
| DE | 3737675 A1 | * | 10/1988 | |
| DE | 29801953 U1 | * | 4/1998 | ............ B32B 27/12 |
| DE | 29805622 U1 | * | 6/1998 | ............ B32B 27/12 |
| DE | 29811128 U1 | * | 9/1998 | ............ B32B 25/10 |
| DE | 19755229 A1 | * | 6/1999 | ............ D04H 13/00 |
| DE | 10234018 A1 | * | 2/2004 | ............ B32B 11/02 |
| DE | 102006057139 A1 | * | 6/2008 | ............ B32B 27/12 |
| DE | 102008024944 A1 | * | 2/2009 | ............ D04H 1/541 |
| DE | 102013108521 A1 | * | 2/2015 | ............ B32B 27/02 |
| DE | 102014001792 A1 | * | 8/2015 | ............ D04H 1/4282 |
| DE | 102017004350 A1 | * | 11/2018 | ............ B32B 27/065 |
| EP | 0179162 A1 | * | 4/1986 | |
| EP | 708212 A1 | * | 4/1996 | ............ B32B 27/12 |
| EP | 716176 A2 | * | 6/1996 | ............ D04H 13/00 |
| EP | 742305 A1 | * | 11/1996 | ............ B32B 27/02 |
| EP | 855479 A2 | * | 7/1998 | ............ B32B 27/12 |
| EP | 885716 A2 | * | 12/1998 | ............ B32B 27/12 |
| EP | 1022125 A1 | * | 7/2000 | ....... A61F 13/51458 |
| EP | 1024218 A2 | * | 8/2000 | ............ D04H 1/54 |
| EP | 1085141 A2 | * | 3/2001 | ............ E04D 12/002 |
| EP | 1191161 A2 | * | 3/2002 | ............ E04B 7/20 |
| EP | 1500493 A1 | * | 1/2005 | ............ B32B 11/04 |
| EP | 1772259 A1 | * | 4/2007 | ............ B32B 27/12 |
| EP | 2065534 A1 | * | 6/2009 | ............ B32B 27/12 |
| EP | 3002382 A1 | * | 4/2016 | ............ B29C 44/065 |
| EP | 3345757 A1 | * | 7/2018 | ............ B32B 27/12 |
| GB | 2341578 A | * | 3/2000 | ............ B32B 27/12 |
| GB | 2494543 A | * | 3/2013 | ......... B32B 37/0084 |
| GB | 2495622 A | * | 4/2013 | ............ B32B 27/12 |
| GB | 2496244 A | * | 5/2013 | ......... B32B 37/0076 |
| GB | 2518055 A | * | 3/2015 | ............ B32B 5/022 |
| JP | 02118177 A | * | 5/1990 | |
| JP | 06264572 A | * | 9/1994 | |
| JP | 09078426 A | * | 3/1997 | |
| JP | 09111969 A | * | 4/1997 | |
| JP | 11050609 A | * | 2/1999 | |
| JP | 11091018 A | * | 4/1999 | |
| JP | 11166300 A | * | 6/1999 | |
| JP | 2001009945 A | * | 1/2001 | |
| JP | 2001132180 A | * | 5/2001 | |
| JP | 2001232710 A | * | 8/2001 | |
| JP | 2001240648 A | * | 9/2001 | |
| JP | 2001241118 A | * | 9/2001 | |
| JP | 2001279880 A | * | 10/2001 | |
| JP | 2002227352 A | * | 8/2002 | |
| JP | 2002339527 A | * | 11/2002 | |
| JP | 2002349021 A | * | 12/2002 | |
| JP | 2002349022 A | * | 12/2002 | |
| JP | 2002356958 A | * | 12/2002 | |
| JP | 2004052473 A | * | 2/2004 | |
| JP | 2006057444 A | * | 3/2006 | |
| JP | 2006177106 A | * | 7/2006 | |
| JP | 2006328879 A | * | 12/2006 | |
| JP | 2007120300 A | * | 5/2007 | |
| JP | 2007223046 A | * | 9/2007 | |
| JP | 2008303549 A | * | 12/2008 | ............ B32B 27/12 |
| JP | 2008308903 A | * | 12/2008 | |
| JP | 2010275842 A | * | 12/2010 | |
| JP | 2012167451 A | * | 9/2012 | |
| JP | 2013064304 A | * | 4/2013 | |
| JP | 2013100648 A | * | 5/2013 | |
| JP | 5669969 B1 | * | 2/2015 | ............ B32B 11/02 |
| JP | 2015169038 A | * | 9/2015 | |
| JP | 2015194048 A | * | 11/2015 | |
| JP | 2016003504 A | * | 1/2016 | |
| JP | 2016094735 A | * | 5/2016 | |
| JP | 2017125351 A | * | 7/2017 | |
| JP | 2018168554 A | * | 11/2018 | |
| JP | 2018176619 A | * | 11/2018 | |
| KR | 2018091556 A | * | 8/2018 | ............ B32B 11/10 |
| WO | WO-9636778 A1 | * | 11/1996 | ............... B32B 5/26 |
| WO | WO-9730244 A2 | * | 8/1997 | ............ B32B 27/02 |
| WO | WO-9902797 A1 | * | 1/1999 | ............... B32B 1/00 |
| WO | WO-9955983 A1 | * | 11/1999 | ........... E04D 12/002 |
| WO | WO-0046464 A1 | * | 8/2000 | ............ B32B 27/12 |
| WO | WO-0173242 A1 | * | 10/2001 | ............ B32B 11/02 |
| WO | WO-2006080907 A1 | * | 8/2006 | ............... A41D 3/00 |
| WO | WO-2012026532 A1 | * | 3/2012 | ............ B32B 27/08 |
| WO | WO-2015025503 A1 | * | 2/2015 | ............ B32B 5/022 |

OTHER PUBLICATIONS

Machine Translation of EP-1024218-A2, Aug. 2000 (Year: 2000).*
Machine Translation of DE-102013108521-A1, Feb. 2015 (Year: 2015).*
Machine Translation of DE-102015000092-A1 used to cite EP-3002382-A1, Apr. 2016 (Year: 2016).*

* cited by examiner

ROOFING UNDERLAYMENT WITH HYDROPHOBIC NONWOVEN CORE

CROSS-REFERENCE TO RELATED APPLICATIONS

This application claims priority to and the benefit of U.S. Provisional Patent Application No. 62/865,581, filed Jun. 24, 2019, the entire content of which is incorporated by reference herein.

FIELD

The general inventive concepts relate to underlayments and, more particularly, to a roofing underlayment having a hydrophobic nonwoven core layer that provides enhanced resistance to water infiltration.

BACKGROUND

Underlayments are commonly used in roofing applications along with an overlayment roofing material, such as asphalt shingles, slate tiles, wooden shakes, metal roofing, and so forth. Underlayments are generally secured to a roof deck and provide the first protection against water infiltration into the interior structure of a building during construction and subsequently become a secondary barrier to water infiltration into the interior upon installation of the primary overlayment roofing material.

Conventional synthetic roofing underlayments typically utilize a woven polymer scrim as a core layer. Based on their structure, woven scrims can allow water infiltration and, thus, rely on outer coating layers for protection against water infiltration. Furthermore, conventional synthetic roofing underlayments tend to lack sufficient bulk such that common worksite debris (e.g., roofing granules) can easily penetrate the underlayment and create openings for water infiltration.

SUMMARY

The general inventive concepts relate to a roofing underlayment having a hydrophobic nonwoven core layer that provides enhanced resistance to water infiltration. To illustrate various aspects of the general inventive concepts, several exemplary embodiments of the roofing underlayment are disclosed.

In one exemplary embodiment, a roofing underlayment includes a hydrophobic nonwoven core layer, a first coating layer adhered to a first surface of the hydrophobic nonwoven core layer, and a first exterior surface layer adhered to the first coating layer. The hydrophobic nonwoven core layer enhances resistance to water infiltration through the roofing underlayment due to the hydrophobic nature of the hydrophobic nonwoven core layer as well as the structure of the hydrophobic nonwoven core layer. The hydrophobic nonwoven core layer has a basis weight of 100 g/m$^2$ to 250 g/m$^2$.

In one exemplary embodiment, a roofing system is provided. The roofing system includes a roof deck, a roofing underlayment attached to the roof deck, and a roofing material positioned on the roofing underlayment. The roofing underlayment includes a hydrophobic nonwoven core layer, a first coating layer adhered to a first surface of the hydrophobic nonwoven core layer, and a first exterior surface layer adhered to the first coating layer. The hydrophobic nonwoven core layer has a basis weight of 100 g/m$^2$ to 250 g/m$^2$.

Other aspects, advantages, and features of the general inventive concepts will become apparent to those skilled in the art from the following detailed description, when read in light of the accompanying drawings.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts relate to roofing underlayments configured to enhance resistance against water infiltration. As will be described in further detail below, enhanced resistance against water infiltration is achieved by incorporating a hydrophobic nonwoven core layer into the roofing underlayment. The term "hydrophobic" as used herein refers to a material and/or a surface that exhibits a water contact angle of at least 90°, including a water contact angle of 90° to 180°, a water contact angle of 100° to 170°, a water contact angle of 110° to 160°, a water contact angle of 120° to 150°, and also including a water contact angle of 90° to 120°.

Figure 1:
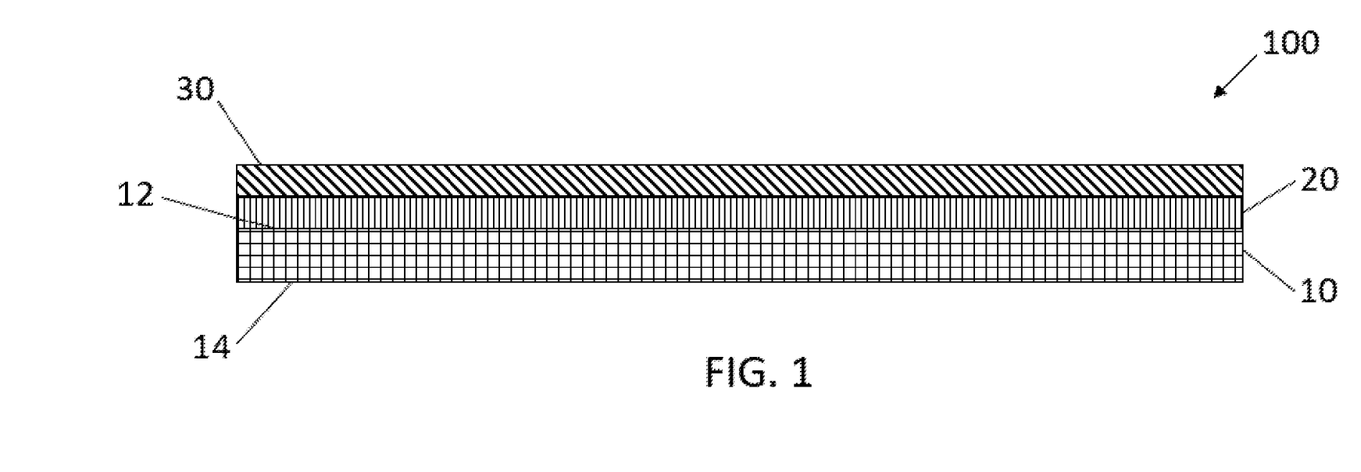
FIG. 1 is a cross-sectional view of an embodiment of a roofing underlayment according to the present disclosure.

In one exemplary embodiment, a roofing underlayment 100 is provided. Referring to FIG. 1, the roofing underlayment 100 comprises a hydrophobic nonwoven core layer 10 having a first surface 12 (e.g., a top surface) and a second surface 14 (e.g., a bottom surface), and a first coating layer 20 adhered to the first surface 12 of the hydrophobic nonwoven core layer 10. The roofing underlayment 100 also includes a first exterior surface layer 30 adhered to the first coating layer 20.

The hydrophobic nonwoven core layer 10 of the present disclosure may be formed from a variety of hydrophobic materials, most typically one or more hydrophobic polymeric materials. Exemplary materials suitable for forming the hydrophobic nonwoven core layer 10 of the present disclosure include, but are not limited to, a polyolefin (e.g., polyethylene, polypropylene), a polyester, a glass (e.g., woven glass mat, nonwoven glass mat), a polystyrene, a polyamide, a polyimide, a polycarbonate, an acrylic polymer, a fluoropolymer (e.g., polyvinylidene fluoride, polytetrafluoroethylene), a polyvinyl chloride, and combinations thereof. The material used to form the hydrophobic nonwoven core layer 10 of the present disclosure may comprise a virgin material and/or a recycled/reprocessed material. In general, the material used to form the hydrophobic nonwoven core layer 10 will be in the form of fibers, which may be continuous and/or discontinuous (e.g., chopped) fibers. In certain embodiments, the hydrophobic nonwoven core layer 10 comprises a polyolefin. In certain embodiments, the hydrophobic nonwoven core layer 10 comprises at least one of a polypropylene and a polyethylene. The hydrophobic nonwoven core layer 10 of the present disclosure may also comprise additives such as colorants, pigments, antioxidants, U.V. stabilizers, fire retardants, fillers, and the like.

The hydrophobic nonwoven core layer 10 of the present disclosure has a nonwoven structure, which may be formed in a variety of ways. For example, in certain embodiments, the hydrophobic nonwoven core layer 10 may be formed using a spun melt process (e.g., spunbond, melt-blown), a dry-laid process (e.g., air-laid, carded), or a wet-laid process. In certain embodiments, the hydrophobic nonwoven core layer 10 is a spunbond nonwoven material. Regardless of the process used to form the hydrophobic nonwoven core layer 10, the fibers comprising the hydrophobic nonwoven core layer 10 are generally bonded together. For example, in certain embodiments, the fibers comprising the hydrophobic nonwoven core layer 10 may be mechanically bonded (e.g., hydroentangled, needle-punched), thermally bonded, chemically bonded (e.g., adhesive, binder), or combinations of these bonding methods. In certain embodiments, the hydrophobic nonwoven core layer 10 is thermally bonded using heated calender rollers. In certain embodiments, the hydrophobic nonwoven core layer 10 is point bonded. Point bonded nonwovens are bonded, for example, using heated nips on rolls, usually in the form of a pattern, to bond certain points of the nonwoven and leave other portions loose or unbonded.

As mentioned above, the hydrophobic nonwoven core layer 10 of the present disclosure has a nonwoven structure. In conventional roofing underlayments that include a nonwoven layer, the nonwoven layer typically forms an outer surface of the roofing underlayment and has a basis weight of less than 110 $g/m^2$, and typically less than 100 $g/m^2$, and the roofing underlayment has a total basis weight of 150 $g/m^2$ to 180 $g/m^2$. Such conventional nonwoven layers can be susceptible to water infiltration, and even more so if an outer layer (e.g., a coating layer) is omitted or otherwise damaged during installation by worksite debris (e.g., roofing granules), or when the roofing underlayment is mechanically secured to a roof deck with fasteners (e.g., nails, staples). In contrast to conventional roofing underlayments that include a nonwoven layer, the hydrophobic nonwoven core layer 10 of the present disclosure forms the primary reinforcing structure of the roofing underlayment 100 and has a basis weight of 100 $g/m^2$ to 250 $g/m^2$. Such a basis weight yields a structure having a strength and a thickness that protects against damage, such as holes and/or punctures, caused by common worksite debris. Furthermore, the basis weight of the hydrophobic nonwoven core layer 10 of the present disclosure promotes enhanced resistance to water infiltration when the roofing underlayment 100 is mechanically secured to a roof deck or other substrate using fasteners.

In certain embodiments, the hydrophobic nonwoven core layer 10 of the present disclosure has a basis weight of 110 $g/m^2$ to 250 $g/m^2$. In certain embodiments, the hydrophobic nonwoven core layer 10 of the present disclosure has a basis weight of 120 $g/m^2$ to 245 $g/m^2$. In certain embodiments, the hydrophobic nonwoven core layer 10 of the present disclosure has a basis weight of 130 $g/m^2$ to 240 $g/m^2$. In certain embodiments, the hydrophobic nonwoven core layer 10 of the present disclosure has a basis weight of 135 $g/m^2$ to 230 $g/m^2$. In certain embodiments, the hydrophobic nonwoven core layer 10 of the present disclosure has a basis weight of 140 $g/m^2$ to 220 $g/m^2$. In certain embodiments, the hydrophobic nonwoven core layer 10 of the present disclosure has a basis weight of 150 $g/m^2$ to 200 $g/m^2$. In certain embodiments, the hydrophobic nonwoven core layer 10 of the present disclosure has a basis weight of 135 $g/m^2$ to 155 $g/m^2$. In certain embodiments, the hydrophobic nonwoven core layer 10 of the present disclosure has a basis weight of 140 $g/m^2$ to 150 $g/m^2$. In certain embodiments, the hydrophobic nonwoven core layer 10 of the present disclosure has a basis weight of 105 $g/m^2$ to 115 $g/m^2$. In certain embodiments, the hydrophobic nonwoven core layer 10 of the present disclosure has a basis weight of 115 $g/m^2$ to 125 $g/m^2$.

In certain embodiments, the hydrophobic nonwoven core layer 10 of the present disclosure has a thickness of 0.1 mm (about 3.9 mil) to 1 mm (about 40 mil). In certain embodiments, the hydrophobic nonwoven core layer 10 of the present disclosure has a thickness of 0.3 mm (about 12 mil) to 1 mm (about 40 mil), including a thickness of 0.4 mm (about 15.7 mil) to 1 mm (about 40 mil), a thickness of 0.5 mm (about 19.7 mil) to 0.9 mm (about 35.43 mil), a thickness of 0.6 mm (about 23.6 mil) to 0.85 mm (about 33.5 mil), and also including a thickness of 0.7 mm (about 27.5 mil) to 0.8 mm (about 31.5 mil).

As mentioned above, the hydrophobic nonwoven core layer 10 is the primary reinforcing structure of the roofing underlayment 100 of the present disclosure. In certain embodiments, the hydrophobic nonwoven core layer 10 comprises at least 50% of a total basis weight of the roofing underlayment 100. In certain embodiments, the hydrophobic nonwoven core layer 10 comprises from 50% to 80% of the total basis weight of the roofing underlayment 100. In certain embodiments, the hydrophobic nonwoven core layer 10 comprises from 50% to 65% of the total basis weight of the roofing underlayment 100. In certain embodiments, the hydrophobic nonwoven core layer 10 comprises from 55% to 60% of the total basis weight of the roofing underlayment 100. In certain embodiments, the hydrophobic nonwoven core layer 10 of the present disclosure has a basis weight of 135 $g/m^2$ to 155 $g/m^2$ and the hydrophobic nonwoven core layer 10 comprises from 50% to 80% of the total basis weight of the roofing underlayment 100. In certain embodiments, the hydrophobic nonwoven core layer 10 of the present disclosure has a basis weight of 105 $g/m^2$ to 115 $g/m^2$ and the hydrophobic nonwoven core layer 10 comprises from 50% to 60% of the total basis weight of the roofing underlayment 100. In certain embodiments, the hydrophobic nonwoven core layer 10 of the present disclosure has a basis weight of 115 $g/m^2$ to 125 $g/m^2$ and the hydrophobic nonwoven core layer 10 comprises from 55% to 65% of the total basis weight of the roofing underlayment 100. In certain embodiments, the hydrophobic nonwoven core layer 10 of the present disclosure comprises 45% to 55% by weight virgin polypropylene, 40% to 50% by weight recycled/reprocessed polypropylene, and 0.5% to 5% by weight colorant (e.g., color masterbatch), based on the total weight of the hydrophobic nonwoven core layer 10.

With continued reference to FIG. 1, the roofing underlayment 100 of the present disclosure also includes a first coating layer 20 adhered to the first surface 12 of the hydrophobic nonwoven core layer 10. The first coating layer 20 of the present disclosure is generally water impermeable and may be formed from a variety of materials, most typically one or more polymeric materials. Exemplary materials suitable for forming the first coating layer 20 of the present disclosure include, but are not limited to, a polyolefin (e.g., polyethylene, polypropylene), a polyester, a polystyrene, a polyamide, a polyurethane, a polycarbonate, an ethylene-acrylic copolymer, an adhesive (e.g., hot melt adhesive), a thermoplastic elastomer (e.g., a styrenic block copolymer, a thermoplastic polyolefin elastomer, a thermoplastic vulcanizate, a thermoplastic polyurethane, a thermoplastic copolyester, a thermoplastic polyamide), and combinations thereof. The material used to form the first coating layer 20 of the present disclosure may comprise a virgin material and/or a recycled/reprocessed material. In certain embodiments, the first coating layer 20 comprises a polyolefin. In certain embodiments, the first coating layer 20 comprises at least one of a polypropylene and a polyethylene. In certain embodiments, the first coating layer 20 comprises a thermoplastic elastomer and a polyolefin, such as a polypropylene and/or a polyethylene. The first coating layer 20 of the present disclosure may also comprise additives such as colorants, pigments, antioxidants, U.V. stabilizers, fire retardants, fillers, and the like.

The first coating layer 20 of the present disclosure may be structured in a variety of ways. For example, the first coating layer 20 may be a woven material, a nonwoven material, or a film material. In certain embodiments, the first coating layer 20 is a film material that is formed using an extrusion process. For example, the first coating layer 20 is applied between the hydrophobic nonwoven core layer 10 and the first exterior surface layer 30 as a curtain of molten polymer material, which is laminated together to form the roofing underlayment 100. Thus, in addition to providing a water impermeable layer, the first coating layer 20 may also function as an adhesive to join the hydrophobic nonwoven core layer 10 to the first exterior surface layer 30. In certain embodiments, the first coating layer 20 of the present disclosure has a basis weight of 14 $g/m^2$ to 50 $g/m^2$, including a basis weight of 20 $g/m^2$ to 45 $g/m^2$, a basis weight of 25 $g/m^2$ to 40 $g/m^2$, and also including a basis weight of 25 $g/m^2$ to 35 $g/m^2$.

In certain embodiments, the first coating layer 20 is a film material, preferably formed using an extrusion process, comprising at least one of a polypropylene and a polyethylene, and having a basis weight of 25 $g/m^2$ to 35 $g/m^2$. In certain embodiments, the first coating layer 20 is a film material, preferably formed using an extrusion process, having a basis weight of 25 $g/m^2$ to 35 $g/m^2$ and comprises 35% to 50% by weight recycled/reprocessed polypropylene, 35% to 45% by weight virgin polypropylene, 5% to 20% by weight low density polyethylene (LDPE), and 2% to 8% by weight colorant (e.g., color masterbatch), wherein the weight percentages are based on the total weight of the first coating layer 20.

In certain embodiments, the first coating layer 20 is a film material, preferably formed using an extrusion process, comprising at least one of a polypropylene and a polyethylene, and having a basis weight of 15 $g/m^2$ to 25 $g/m^2$. In certain embodiments, the first coating layer 20 is a film material, preferably formed using an extrusion process, having a basis weight of 15 $g/m^2$ to 25 $g/m^2$ and comprises 40% to 50% by weight recycled/reprocessed polypropylene, 30% to 40% by weight virgin polypropylene, 10% to 20% by weight low density polyethylene (LDPE), and 4% to 8% by weight colorant (e.g., color masterbatch), wherein the weight percentages are based on the total weight of the first coating layer 20.

In certain embodiments, the first coating layer 20 is a film material, preferably formed using an extrusion process, comprising at least one of a thermoplastic elastomer, a polypropylene, and a polyethylene, and having a basis weight of 15 $g/m^2$ to 25 $g/m^2$. In certain embodiments, the first coating layer 20 is a film material, preferably formed using an extrusion process, having a basis weight of 15 $g/m^2$ to 25 $g/m^2$ and comprises 40% to 50% by weight recycled/reprocessed polypropylene, 25% to 35% by weight thermoplastic elastomer, 10% to 20% by weight LDPE, 2% to 8% by weight colorant (e.g., color masterbatch), and 1% to 7% by weight virgin polypropylene, wherein the weight percentages are based on the total weight of the first coating layer 20.

In certain embodiments, when the first coating layer 20 of the present disclosure comprises a hot melt adhesive, the first coating layer 20 may have a basis weight of 5 $g/m^2$ to 30 $g/m^2$, including a basis weight of 5 $g/m^2$ to 25 $g/m^2$, a basis weight of 5 $g/m^2$ to 20 $g/m^2$, and also including a basis weight of 5 $g/m^2$ to 15 $g/m^2$.

The roofing underlayment 100 of the present disclosure also includes a first exterior surface layer 30. As shown in FIG. 1, the first exterior surface layer 30 is the top surface layer of the roofing underlayment 100. The first exterior surface layer 30 may be formed from a variety of materials, most typically one or more polymeric materials. Exemplary materials suitable for forming the first exterior surface layer 30 include, but are not limited to, a polyolefin (e.g., a polyethylene, a polypropylene), a thermoplastic elastomer (e.g., a styrenic block copolymer, a thermoplastic polyolefin elastomer, a thermoplastic vulcanizate, a thermoplastic polyurethane, a thermoplastic copolyester, a thermoplastic polyamide), a polyester, a polystyrene, a polyamide, a polyurethane, a polycarbonate, an ethylene-acrylic copolymer, an ethylene methyl acrylate (EMA) copolymer, an ethylene vinyl acetate (EVA) copolymer, and combinations thereof. The material used to form the first exterior surface layer 30 may comprise a virgin material and/or a recycled/reprocessed material. In certain embodiments, the first exterior surface layer 30 comprises at least one of a polyolefin and a thermoplastic elastomer. In certain embodiments, the first exterior surface layer 30 comprises at least one of a polypropylene and a thermoplastic elastomer. The first exterior surface layer 30 may also comprise additives such as colorants, pigments, antioxidants, U.V. stabilizers, fire retardants, fillers, and the like.

The first exterior surface layer 30 shown in FIG. 1 may be structured in a variety of ways. For example, the first exterior surface layer 30 may be a nonwoven material, a woven material, or a film material. In certain embodiments, the first exterior surface layer 30 is a spunbond nonwoven material. In general, and regardless of form, the first exterior surface layer 30 has a basis weight of 10 $g/m^2$ to 120 $g/m^2$, including a basis weight of 10 $g/m^2$ to 100 $g/m^2$, a basis weight of 10 $g/m^2$ to 80 $g/m^2$, a basis weight of 15 $g/m^2$ to 75 $g/m^2$, a basis weight of 20 $g/m^2$ to 75 $g/m^2$, a basis weight of 35 $g/m^2$ to 75 $g/m^2$, a basis weight of 40 $g/m^2$ to 65 $g/m^2$, and also including a basis weight of 45 $g/m^2$ to 55 $g/m^2$. In certain embodiments, the first exterior surface layer 30 is a spunbond nonwoven material comprising at least one of a polyolefin and a thermoplastic elastomer, and having a basis weight of 45 $g/m^2$ to 55 $g/m^2$. In certain embodiments, the first exterior surface layer 30 is a spunbond nonwoven material comprising at least one of a polypropylene and a thermoplastic elastomer, and having a basis weight of 45 $g/m^2$ to 55 $g/m^2$. The inclusion of a thermoplastic elastomer material in the first exterior surface layer 30 can promote enhanced walkability (i.e., foot traction) due to the rubbery nature and gripping ability associated with thermoplastic elastomer materials. The term "walkability" refers to characteristics of an underlayment that make it less likely for a person walking on the underlayment to slip or lose foot traction thereon.

In certain embodiments, the first exterior surface layer 30 is a spunbond nonwoven material comprising a polyolefin and having a basis weight of 45 g/m² to 55 g/m². In certain embodiments, the first exterior surface layer 30 is a spunbond nonwoven material having a basis weight of 45 g/m² to 55 g/m² and comprises 45% to 55% by weight virgin polypropylene, 40% to 50% by weight recycled/reprocessed polypropylene, and 1% to 5% by weight colorant (e.g., color masterbatch), based on the total weight of the first exterior surface layer 30.

In certain embodiments, the first exterior surface layer 30 comprises a bicomponent spunbond nonwoven material formed using a dual beam spunbond process, as known in the art. In certain embodiments, the bicomponent spunbond nonwoven material includes a polyolefin layer and a thermoplastic elastomer layer which are bonded together (e.g., by heat pressing, calendering, needling, ultrasonic bonding or welding, adhesives, tie layers, and/or point bonding) to form the first exterior surface layer 30. In these embodiments, the polyolefin layer of the first exterior surface layer 30 is configured to abut the first coating layer 20 of the roofing underlayment 100 and, thus, the thermoplastic elastomer layer of the first exterior surface layer 30 forms an outermost surface of the roofing underlayment 100.

In certain embodiments, the first exterior surface layer 30 comprises a bicomponent spunbond nonwoven material having a polyolefin layer and a thermoplastic elastomer layer. In certain embodiments, the first exterior surface layer 30 has a total basis weight of 30 g/m² to 60 g/m². In certain embodiments, the polyolefin layer of the first exterior surface layer 30 has a basis weight of 15 g/m² to 30 g/m², including a basis weight of 15 g/m² to 25 g/m² and a basis weight of 20 g/m² to 30 g/m², and comprises 84% to 98% by weight virgin polypropylene, 1% to 8% by weight U.V. stabilizer (e.g., a U.V. masterbatch), and 1% to 8% by weight colorant (e.g., color masterbatch), based on the total weight of the polyolefin layer; and the thermoplastic elastomer layer of the first exterior surface layer 30 has a basis weight of 15 g/m² to 30 g/m², including a basis weight of 15 g/m² to 25 g/m² and a basis weight of 20 g/m² to 30 g/m², and comprises 70% to 80% by weight virgin polypropylene, 15% to 25% thermoplastic elastomer, 1% to 8% by weight U.V. stabilizer (e.g., a U.V. masterbatch), and 1% to 8% by weight colorant (e.g., color masterbatch), based on the total weight of the thermoplastic elastomer layer.

In certain embodiments, the first exterior surface layer 30 comprises a bicomponent spunbond nonwoven material having a polyolefin layer and a thermoplastic elastomer layer. In certain embodiments, the first exterior surface layer 30 has a total basis weight of 45 g/m² to 55 g/m². In certain embodiments, the polyolefin layer of the first exterior surface layer 30 has a basis weight of 20 g/m² to 30 g/m² and comprises 45% to 55% by weight virgin polypropylene, 40% to 50% by weight recycled/reprocessed polypropylene, and 1% to 5% by weight colorant (e.g., color masterbatch), based on the total weight of the polyolefin layer; and the thermoplastic elastomer layer of the first exterior surface layer 30 has a basis weight of 20 g/m² to 30 g/m² and comprises 70% to 80% by weight virgin polypropylene, 15% to 25% thermoplastic elastomer, and 1% to 5% by weight colorant (e.g., color masterbatch), based on the total weight of the thermoplastic elastomer layer.

In certain embodiments, the first exterior surface layer 30 is a melt-blown nonwoven material. In certain embodiments, the first exterior surface layer 30 is a melt-blown nonwoven material comprising a polyolefin and having a basis weight of 10 g/m² to 80 g/m². In certain embodiments, the first exterior surface layer 30 is a melt-blown nonwoven material comprising a polypropylene and having a basis weight of 25 g/m² to 50 g/m². In certain embodiments, the first exterior surface layer 30 is a melt-blown nonwoven material having a basis weight of 30 g/m² to 40 g/m² and comprising a polypropylene and a U.V. stabilizer (e.g., a U.V. masterbatch). In certain embodiments, the first exterior surface layer 30 is a melt-blown nonwoven material having a basis weight of 30 g/m² to 40 g/m² and comprising a polypropylene. In certain embodiments, the first exterior surface layer 30 is a melt-blown nonwoven material having a basis weight of 40 g/m² to 50 g/m² and comprising a polypropylene. Configuring the first exterior surface layer 30 as a melt-blown nonwoven layer 30 may enhance walkability by providing a rough surface.

Figure 2:
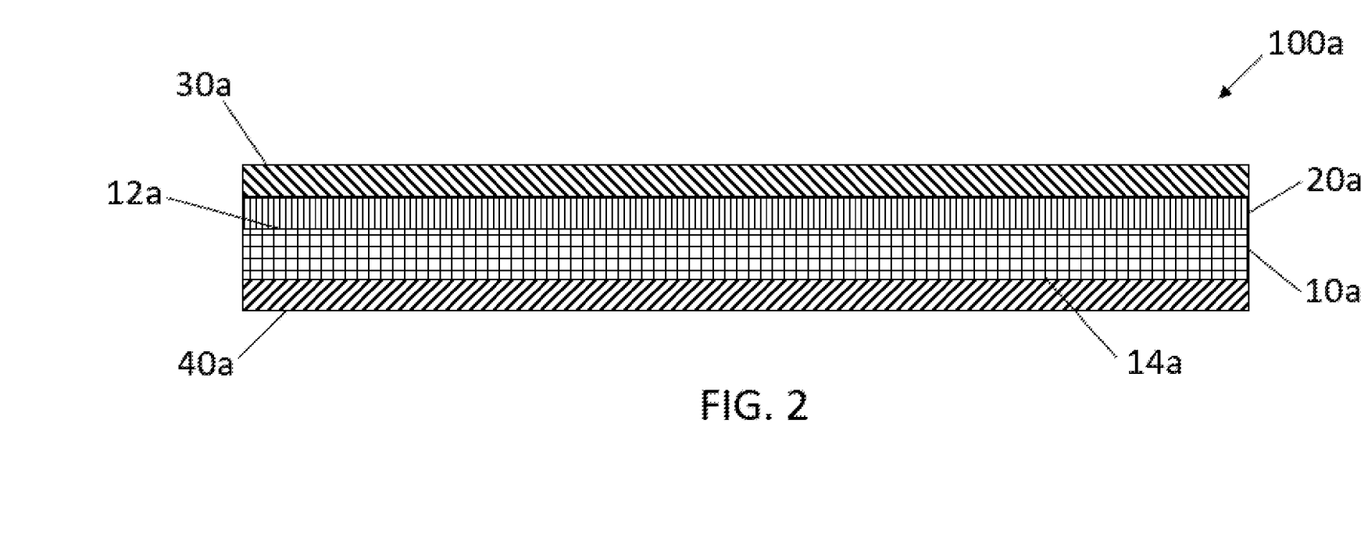
FIG. 2 is a cross-sectional view of an embodiment of a roofing underlayment according to the present disclosure.

Referring now to FIG. 2, an exemplary embodiment of a roofing underlayment 100a of the present disclosure is shown. The roofing underlayment 100a shown in FIG. 2 is structured similarly to the roofing underlayment 100 illustrated in FIG. 1 except the roofing underlayment 100a shown in FIG. 2 includes a second exterior surface layer 40a. As seen in FIG. 2, the roofing underlayment 100a comprises a hydrophobic nonwoven core layer 10a having a first surface 12a (e.g., a top surface) and a second surface 14a (e.g., a bottom surface), a first coating layer 20a adhered to the first surface 12a of the hydrophobic nonwoven core layer 10a, and a first exterior surface layer 30a adhered to the first coating layer 20a. The second exterior surface layer 40a is adhered to the second surface 14a of the hydrophobic nonwoven core layer 10a. The various embodiments of the individual layers 10, 20, 30 of the roofing underlayment 100 described above with reference to FIG. 1 may also be used for the individual layers 10a, 20a, 30a of the roofing underlayment 100a illustrated in FIG. 2.

As mentioned above, the roofing underlayment 100a shown in FIG. 2 includes a second exterior surface layer 40a adhered to the second surface 14a of the hydrophobic nonwoven core layer 10a. The second exterior surface layer 40a of the present disclosure is generally water impermeable and may be formed from a variety of materials, most typically one or more polymeric materials. Exemplary materials suitable for forming the second exterior surface layer 40a of the present disclosure include, but are not limited to, a polyolefin (e.g., a polyethylene, a polypropylene), a thermoplastic elastomer (e.g., a styrenic block copolymer, a thermoplastic polyolefin elastomer, a thermoplastic vulcanizate, a thermoplastic polyurethane, a thermoplastic copolyester, a thermoplastic polyamide), a polyester, a polystyrene, a polyamide, a polyurethane, a polycarbonate, an ethylene-acrylic copolymer, an ethylene methyl acrylate (EMA) copolymer, an ethylene vinyl acetate (EVA) copolymer, and combinations thereof. The material used to form the second exterior surface layer 40a of the present disclosure may comprise a virgin material and/or a recycled/reprocessed material.

In certain embodiments, the second exterior surface layer 40a comprises at least one of a polyolefin and a thermoplastic elastomer. In certain embodiments, the second exterior surface layer 40a comprises at least one of a polypropylene, a polyethylene, and a thermoplastic elastomer. In certain embodiments, the second exterior surface layer 40a comprises a polypropylene, a polyethylene, and a thermoplastic elastomer. The second exterior surface layer 40a of the present disclosure may also comprise additives such as colorants, pigments, antioxidants, U.V. stabilizers, fire retardants, fillers, and the like.

The second exterior surface layer 40a of the present disclosure may be structured in a variety of ways. For example, the second exterior surface layer 40a may be a film material, a woven material, or a nonwoven material. In certain embodiments, the second exterior surface layer 40a is a film material that is extruded onto or laminated onto (e.g., using an adhesive) the second surface 14a of the hydrophobic nonwoven core layer 10a. In certain embodiments, the second exterior surface layer 40a is a multi-layer film material comprising a thermoplastic elastomer layer and a polyolefin layer that is formed using a co-extrusion process. In certain embodiments, the thermoplastic elastomer layer of the second exterior surface layer 40a comprises a thermoplastic elastomer and a polyolefin, such as a polypropylene and/or a polyethylene. In certain embodiments, the polyolefin layer of the second exterior surface layer 40a comprises at least one of a polypropylene and/or a polyethylene. The thermoplastic elastomer layer and/or the polyolefin layer of the second exterior surface layer 40a of the present disclosure may also comprise additives such as colorants, pigments, antioxidants, U.V. stabilizers, fire retardants, fillers, and the like.

In certain embodiments, the second exterior surface layer 40a is applied to the second surface 14a of the hydrophobic nonwoven core layer 10a (which may already include a first coating layer 20a adhered to the first surface 12a of the hydrophobic nonwoven layer 10a and a first exterior surface layer 30a adhered to the first coating layer 20a) as a curtain of molten material comprising a thermoplastic elastomer extrudate and a polyolefin extrudate, which are laminated together to form the roofing underlayment 100a. Preferably, the polyolefin layer of the second exterior surface layer 40a is adhered to the second surface 14a of the hydrophobic nonwoven core layer 10a and the thermoplastic elastomer layer of the second exterior surface layer 40a forms a bottommost surface (i.e., the surface intended to contact a roof deck or other substrate) of the roofing underlayment 100a. Because of the rubbery nature and gripping ability associated with thermoplastic elastomer materials, including a thermoplastic elastomer layer as the portion of the second exterior surface layer 40a that forms a bottommost surface of the roofing underlayment 100a imparts enhanced slip resistance (i.e., the ability to resist movement relative to a substrate) to the roofing underlayment 100a.

In certain embodiments, the second exterior surface layer 40a of the present disclosure has a basis weight of 10 g/m$^2$ to 120 g/m$^2$. In certain embodiments, the second exterior surface layer 40a has a basis weight of 10 g/m$^2$ to 100 g/m$^2$. In certain embodiments, the second exterior surface layer 40a has a basis weight of 10 g/m$^2$ to 80 g/m$^2$. In certain embodiments, the second exterior surface layer 40a has a basis weight of 15 g/m$^2$ to 75 g/m$^2$. In certain embodiments, the second exterior surface layer 40a has a basis weight of 20 g/m$^2$ to 50 g/m$^2$. In certain embodiments, the second exterior surface layer 40a has a basis weight of 20 g/m$^2$ to 30 g/m$^2$. In certain embodiments, the second exterior surface layer 40a is a multi-layer film material. The multi-layer film material may be formed using any suitable process. In certain embodiments, the second exterior surface layer 40a is a multi-layer film material formed using a co-extrusion process. In certain embodiments, the multi-layer film material comprises a polyolefin layer having a basis weight of 10.8 g/m$^2$ to 28.8 g/m$^2$ and a thermoplastic elastomer layer having a basis weight of 4.2 g/m$^2$ to 11.2 g/m$^2$. In certain embodiments, the multi-layer film material comprises a polyolefin layer having a basis weight of 10.8 g/m$^2$ to 25.2 g/m$^2$ and a thermoplastic elastomer layer having a basis weight of 4.2 g/m$^2$ to 9.8 g/m$^2$. In certain embodiments, the multi-layer film material forming the second exterior surface layer 40a comprises a polyolefin layer that includes a polypropylene and/or a polyethylene and has a basis weight of 14.4 g/m$^2$ to 21.6 g/m$^2$, and a thermoplastic elastomer layer that has a basis weight of 5.6 g/m$^2$ to 8.4 g/m$^2$.

In certain embodiments, the second exterior surface layer 40a is a multi-layer film material, preferably formed using a co-extrusion process, comprising a polyolefin layer having a basis weight of 15 g/m$^2$ to 25 g/m$^2$ and a thermoplastic elastomer layer having a basis weight of 2 g/m$^2$ to 10 g/m$^2$. In certain embodiments, the polyolefin layer of the second exterior surface layer 40a comprises 40% to 50% by weight recycled/reprocessed polypropylene, 30% to 40% by weight virgin polypropylene, 10% to 20% by weight LDPE, and 2% to 6% by weight colorant (e.g., color masterbatch), wherein the weight percentages are based on the total weight of the polyolefin layer; and the thermoplastic elastomer layer of the second coating layer 40a comprises 40% to 55% by weight thermoplastic elastomer, 25% to 45% by weight virgin polypropylene, 10% to 20% by weight LDPE, and 2% to 6% by weight colorant (e.g., color masterbatch), wherein the weight percentages are based on the total weight of the thermoplastic elastomer layer.

In certain embodiments, the second exterior surface layer 40a is a melt-blown nonwoven material. In certain embodiments, the second exterior surface layer 40a is a melt-blown nonwoven material comprising a polyolefin and having a basis weight of 25 g/m$^2$ to 50 g/m$^2$. In certain embodiments, the second exterior surface layer 40a is a melt-blown nonwoven material comprising a polypropylene and having a basis weight of 25 g/m$^2$ to 50 g/m$^2$. Configuring the second exterior surface layer 40a as a melt-blown nonwoven layer may enhance slip resistance by providing a rough surface that grips the roof deck or other substrate.

The roofing underlayments 100, 100a of the present disclosure generally have a total basis weight of 190 g/m$^2$ to 265 g/m$^2$. In certain embodiments, the roofing underlayments 100, 100a have a total basis weight of 195 g/m$^2$ to 265 g/m$^2$. In certain embodiments, the roofing underlayments 100, 100a have a total basis weight of 210 g/m$^2$ to 260 g/m$^2$. In certain embodiments, the roofing underlayments 100, 100a have a total basis weight of 225 g/m$^2$ to 250 g/m$^2$. In certain embodiments, the roofing underlayments 100, 100a have a total basis weight of 240 g/m$^2$ to 250 g/m$^2$. The roofing underlayments 100, 100a of the present disclosure generally have a total thickness of 0.2 mm (about 7.87 mil) to 1.25 mm (about 50 mil). In certain embodiments, the roofing underlayments 100, 100a of the present disclosure have a total thickness of 0.25 mm (about 10 mil) to 1.25 mm (about 50 mil), including a total thickness of 0.3 mm (about 12 mil) to 1.25 mm (about 50 mil), a total thickness of 0.4 mm (about 15.7 mil) to 1.25 mm (about 50 mil), a total thickness of 0.5 mm (about 19.7 mil) to 1.25 mm (about 50 mil), a total thickness of 0.6 mm (about 23.6 mil) to 1 mm (about 39.4 mil), and also including a thickness of 0.75 mm (about 29.5 mil) to 1 mm (about 39.4 mil).

The roofing underlayments 100, 100a of the present disclosure may be configured as self-adhered (e.g., peel and stick) underlayments. In such embodiments, a layer of adhesive material (not shown) (e.g., an asphalt-based adhesive) is applied to a bottommost surface of the roofing underlayment 100, 100a, and the layer of adhesive material functions to adhere the roofing underlayment 100, 100a to a substrate, such as a roof deck, without using mechanical fasteners (e.g., nails, staples). The layer of adhesive material may be covered with a release material as is customary in the art.

The roofing underlayments 100, 100a of the present disclosure may be formed using conventional manufacturing techniques known to those of skill in the art. In certain embodiments, the roofing underlayments 100, 100a may be formed by adding each layer individually to build up the roofing underlayment 100, 100a. In these or other embodiments, certain layers (e.g., the first exterior surface layer, the hydrophobic nonwoven core layer) may be pre-formed and provided in a process in which additional layers (e.g., the first coating layer, the second exterior surface layer) are laminated or otherwise joined to the pre-formed layers. In certain embodiments, all of the layers may be stacked or arranged together and laminated in a single lamination process. In one or more embodiments, the layers may be bonded or otherwise adhered together by chemical bonding, mechanical bonding, and/or thermal bonding. Exemplary methods of bonding the layers include, but are not limited to, heat pressing, calendering, needling, ultrasonic bonding or welding, adhesives, tie layers, and/or point bonding.

Figure 3:
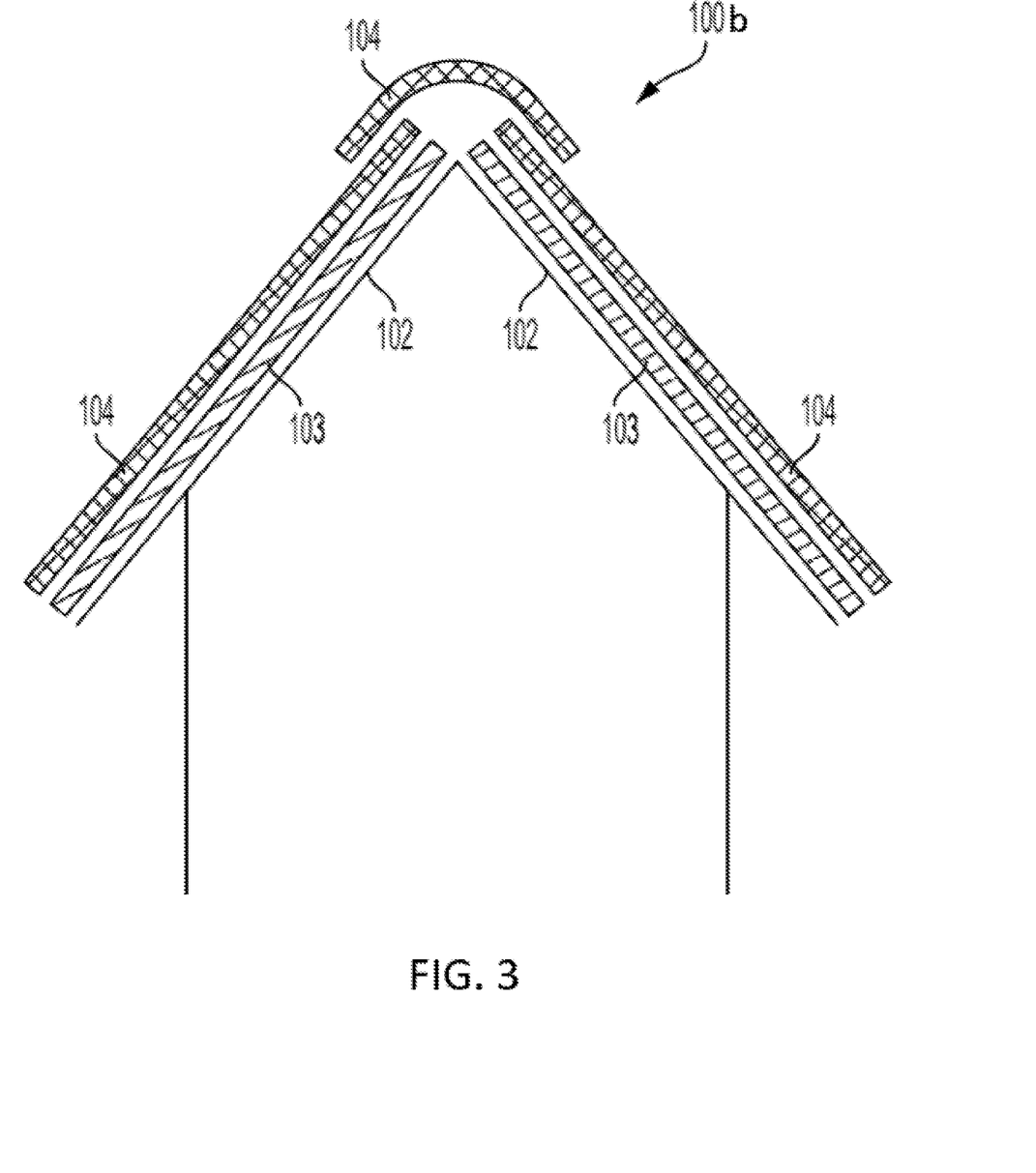
FIG. 3 is a cross-sectional view of an embodiment of a roofing system according to the present disclosure.

Referring now to FIG. 3, an exemplary embodiment of a roofing system 100b of the present disclosure is shown. As seen in FIG. 3, the roofing system 100b includes a roof deck 102, a roofing underlayment 103 attached to the roof deck 102, and a roofing material 104 positioned on the roofing underlayment 103. The roofing underlayment 103 may be configured in accordance with any of the roofing underlayment embodiments and sub-embodiments described above (e.g., roofing underlayment 100 shown in FIG. 1, roofing underlayment 100a shown in FIG. 2). The roofing material 104 may be any conventional exterior roofing material such as asphalt shingles, shake shingles, slate shingles, roof tiles, and so forth.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The underlayments of the present disclosure can comprise, consist of, or consist essentially of the essential elements and limitations of the disclosure as described herein, as well as any additional or optional components or limitations described herein or otherwise known to be useful in underlayment or similar applications.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. Furthermore, the phrase "at least one of A, B, and C" should be interpreted as "only A or only B or only C or any combinations thereof." In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices, systems, and methods disclosed. It is sought, therefore, to cover all such changes and modifications as fall within the spirit and scope of the general inventive concepts, as described and/or claimed herein, and any equivalents thereof.

What is claimed is:

1. A roofing underlayment comprising:
   a hydrophobic nonwoven core layer having a basis weight of 100 $g/m^2$ to 250 $g/m^2$,
   a first coating layer adhered to a first surface of the hydrophobic nonwoven core layer, and
   a first exterior surface layer comprising a bicomponent spunbond nonwoven material having a total basis weight of 30 $g/m^2$ to 60 $g/m^2$ and comprising a polyolefin layer bonded to a thermoplastic elastomer layer, and wherein the polyolefin layer is adhered to the first coating layer.

2. The roofing underlayment according to claim 1, wherein the hydrophobic nonwoven core layer comprises at least one of a polyolefin, a polyester, a polystyrene, a polyamide, a polyurethane, a polycarbonate, and an ethylene acrylic copolymer.

3. The roofing underlayment according to claim 1, wherein the hydrophobic nonwoven core layer comprises a polypropylene.

4. The roofing underlayment according to claim 1, wherein the hydrophobic nonwoven core layer has a basis weight of 105 $g/m^2$ to 150 $g/m^2$.

5. The roofing underlayment according to claim 1, wherein the first coating layer comprises at least one of a polyolefin, a thermoplastic elastomer, a polyester, a polystyrene, a polyamide, a polyurethane, a polycarbonate, and an ethylene acrylic copolymer.

6. The roofing underlayment according to claim 1, wherein the first coating layer has a basis weight of 15 $g/m^2$ to 30 $g/m^2$.

7. The roofing underlayment according to claim 1, wherein the polyolefin layer has a basis weight of 15 g/m$^2$ to 30 g/m$^2$ and comprises 84% to 98% by weight virgin polypropylene, 1% to 8% by weight U.V. stabilizer, and 1% to 8% by weight colorant, based on the total weight of the polyolefin layer; and the thermoplastic elastomer layer has a basis weight of 15 g/m$^2$ to 30 g/m$^2$ and comprises 70% to 80% by weight virgin polypropylene, 15% to 25% thermoplastic elastomer, 1% to 8% by weight U.V. stabilizer, and 1% to 8% by weight colorant, based on the total weight of the thermoplastic elastomer layer.

8. The roofing underlayment according to claim 1, wherein the polyolefin layer has a basis weight of 20 g/m$^2$ to 30 g/m$^2$ and comprises 45% to 55% by weight virgin polypropylene, 40% to 50% by weight recycled/reprocessed polypropylene, and 1% to 5% by weight colorant, based on the total weight of the polyolefin layer; and the thermoplastic elastomer layer has a basis weight of 20 g/m$^2$ to 30 g/m$^2$ and comprises 70% to 80% by weight virgin polypropylene, 15% to 25% thermoplastic elastomer, and 1% to 5% by weight colorant, based on the total weight of the thermoplastic elastomer layer.

9. The roofing underlayment according to claim 1, further comprising a second exterior surface layer adhered to a second surface of the hydrophobic nonwoven core layer opposite the first surface.

10. The roofing underlayment according to claim 9, wherein the second exterior surface layer is a co-extruded layer comprising a thermoplastic elastomer layer and a polyolefin layer and has a basis weight of 10 g/m$^2$ to 120 g/m$^2$.

11. The roofing underlayment according to claim 10, wherein the polyolefin layer has a basis weight of 15 g/m$^2$ to 25 g/m$^2$ and comprises 40% to 50% by weight recycled/reprocessed polypropylene, 30% to 40% by weight virgin polypropylene, 10% to 20% by weight low density polyethylene, and 2% to 6% by weight colorant, based on the total weight of the polyolefin layer; and
   wherein the thermoplastic elastomer layer has a basis weight of 2 g/m$^2$ to 10 g/m$^2$ and comprises 40% to 55% by weight thermoplastic elastomer, 25% to 45% by weight virgin polypropylene, 10% to 20% by weight low density polyethylene, and 2% to 6% by weight colorant, based on the total weight of the thermoplastic elastomer layer.

12. The roofing underlayment according to claim 1, wherein the roofing underlayment has a total basis weight of 190 g/m$^2$ to 265 g/m$^2$.

13. The roofing underlayment according to claim 1, wherein the roofing underlayment has a total basis weight of 225 g/m$^2$ to 250 g/m$^2$.

14. The roofing underlayment according to claim 1, wherein the hydrophobic nonwoven core layer comprises at least 50% of a total basis weight of the roofing underlayment.

15. The roofing underlayment according to claim 1, wherein the hydrophobic nonwoven core layer comprises from 50% to 80% of the total basis weight of the roofing underlayment.

16. A roofing underlayment comprising:
   a hydrophobic nonwoven core layer having a basis weight of 110 g/m$^2$ to 155 g/m$^2$;
   a first coating layer adhered to a first surface of the hydrophobic nonwoven core layer, wherein the first coating layer has a basis weight of 10 g/m$^2$ to 40 g/m$^2$;
   a first exterior surface layer adhered to the first coating layer, wherein the first exterior surface layer has a basis weight of 20 g/m$^2$ to 60 g/m$^2$; and
   a second exterior surface layer adhered to a second surface of the hydrophobic nonwoven core layer opposite the first surface, wherein the second exterior surface layer is a co-extruded layer comprising a thermoplastic elastomer layer having a basis weight of 2 g/m$^2$ to 10 g/m$^2$ and a polyolefin layer having a basis weight of 15 g/m$^2$ to 25 g/m$^2$,
   wherein the hydrophobic nonwoven core layer comprises from 50% to 80% of a total basis weight of the roofing underlayment.

\* \* \* \* \*